(12) United States Patent
Carrick et al.

(10) Patent No.: US 8,701,081 B2
(45) Date of Patent: Apr. 15, 2014

(54) HARDWARE SPECIFIC CODE GENERATION

(75) Inventors: James E. Carrick, Natick, MA (US);
Peter Szpak, Newtown, MA (US);
Robert O. Aberg, South Grafton, MA (US); Andrew C. Bartlett,
Westborough, MA (US); Xiaocang Lin, Wayland, MA (US); Hongbo Yang,
Natick, MA (US)

(73) Assignee: The MathWorks, Inc., Natick, MA (US)

(*) Notice: Subject to any disclaimer, the term of this patent is extended or adjusted under 35 U.S.C. 154(b) by 192 days.

(21) Appl. No.: 13/220,080

(22) Filed: Aug. 29, 2011

(65) Prior Publication Data
US 2012/0005650 A1 Jan. 5, 2012

Related U.S. Application Data

(63) Continuation of application No. 11/651,623, filed on Jan. 10, 2007, now Pat. No. 8,015,543.

(51) Int. Cl.
*G06F 9/44* (2006.01)
(52) U.S. Cl.
CPC .. *G06F 8/34* (2013.01); *G06F 8/35* (2013.01); *G06F 8/37* (2013.01); *G06F 8/38* (2013.01)
USPC ............................ 717/105; 717/109; 717/113
(58) Field of Classification Search
CPC ..................................................... G06F 8/34
USPC .................. 717/104–113, 136–137, 140–147
See application file for complete search history.

(56) References Cited

PUBLICATIONS

W. Aldrich, "Using Model Coverage Analysis to Improve the Controls Development Process", Aug. 2002, AIAA—American Institute of Aeronautics and Astronautics, 11 pages.*
Allen et al., "Interactive Object-Oriented Simulation of Interconnected Power Systems Using SIMULINK", Feb. 2001, IEEE, pp. 87-95.*
Dickey et al., "SmartVehicles: An Open Experimental Platform for the Design, Testing and Implementation of Automotive Embedded Systems—Model Based Integraion of Embedded Software (MoBIES)," Final report, Phase II, Universitry of California, Berkeley, 2001, pp. 10-160.
Young Joon Lee, "The eal-Time Implementation of Hardware-In-the Loop—Systems on Different RTOS Platforms," a Master Thesis at Georgia Institute of Technology, 2003, pp. i-x, 1-91.

* cited by examiner

*Primary Examiner* — Ted T Vo
(74) *Attorney, Agent, or Firm* — Venable LLP; Michael A. Sartori; Todd R. Farnsworth

(57) ABSTRACT

A computer-implemented method for generating code based on a graphical model may include: translating the graphical model into a graphical model code, the graphical model code including a first graphical model code function; performing a lookup of the first graphical model code function in a hardware specific library, the hardware specific library comprising a plurality of relationships between graphical model code functions and hardware specific functions, where the first graphical model code function is one of the graphical model code functions; obtaining a matched hardware specific function based on the lookup, wherein the matched hardware specific function is one of the hardware specific functions from the hardware specific library; and modifying the graphical model code based on the matched hardware specific function.

25 Claims, 17 Drawing Sheets

% Create and hardware specific entry for an operation
op_entry = RTW.TflOperationEntry;
op_entry.setTflOperationEntryParameters( 'Key',          'RTW_OP_MUL', ...
                        'Priority',        30, ...
                        'SaturationMode',  'RTW_SATURATE_UNSPECIFIED', ...
                        'RoundingMode',    'RTW_ROUND_UNSPECIFIED', ...
                        'RelativeScalingFactorF', 1.0, ...
                        'RelativeScalingFactorE', -3.0, ...
                        'PrototypeImplName',   's16_mul_s16_s16_fac0125', ...
                        'PrototypeHeaderFile', 's16_mul_s16_s16_fac0125.h', ...
                        'PrototypeSourceFile', 's16_mul_s16_s16_fac0125.c' );

% Specify the conceptual arguments. Want the TFL to look at all
% multiplications of signed, 16-bit, integers of arbitrary scaling (zero
% bias)
op_entry.createAndAddConceptualArg( 'RTW.TflFcnArgNumeric', ...
                        'Name',        'y1', ...
                        'IOType',      'RTW_IO_OUTPUT', ...
                        'CheckSlope',  false, ...
                        'CheckBias',   false, ...
                        'DataType',    'Fixed', ...
                        'Scaling',     'BinaryPoint', ...
                        'IsSigned',    true, ...
                        'WordLength',  16 );

op_entry.createAndAddConceptualArg( 'RTW.TflFcnArgNumeric', ...
                        'Name',        'u1', ...
                        'IOType',      'RTW_IO_INPUT', ...

FIG. 12A

'CheckSlope',    false,...

'CheckBias',    false,...

'DataType',    'Fixed',...

'Scaling',    'BinaryPoint',...

'IsSigned',    true,...

'WordLength',    16 );

op_entry.createAndAddConceptualArg( 'RTW.TflFcnArgNumeric',...

'Name',    'foo', ...    %%%%%%%%%%% Should be u2

'IOType',    'RTW_IO_INPUT',...

'CheckSlope',    false,...

'CheckBias',    false,...

'DataType',    'Fixed',...

'Scaling',    'BinaryPoint',...

'IsSigned',    true,...

'WordLength',    16 );

% And replace that multiplication with a function call that has the

% following prototype:

%    s16 s16_mul_s16_s16_fac0125( s16 left, s16 right )

op_entry.createAndAddPrototypeInputArg( 'RTW.TflFcnArgNumeric',...

'Name',    'u1', ...

'IOType',    'RTW_IO_INPUT',...

'IsSigned',    true,...

'WordLength', 16, ...

'FractionLength', 0 );

op_entry.createAndAddPrototypeInputArg( 'RTW.TflFcnArgNumeric',...

'Name',    'u2', ...

'IOType',    'RTW_IO_INPUT',...

FIG. 12B

'IsSigned', true,...

'WordLength', 16.0, ...

'FractionLength', 0 );

op_entry.createAndSetPrototypeReturn( 'RTW.TflFcnArgNumeric',...

'Name',     '', ...

'IOType',   'RTW_IO_OUTPUT',...

'IsSigned', true,...

'WordLength', 16.0, ...

'FractionLength', 0 );

hLib.addEntry( op_entry );

FIG. 12C

% Add a hardware specific library to a registry for the graphical model 203
TFLTableRegistry(cm, 'addTFLTarget',...
       'UIName', 'Freescale MPC555 with Code Warrior',...
       'BaseTarget', 'ANSI_C',...
       'TargetHWDeviceType', {'32-Bit PowerPC',...
         'Generic 32-bit embedded Processor'}, ...
      % The Matfile represents the hardware specific library
      'Matfile',   'tfl_c90.mat',...
      'Priority',   100);

FIG. 13

HARDWARE SPECIFIC CODE GENERATION

CROSS-REFERENCE TO RELATED PATENT APPLICATION

This application is a continuation of prior U.S. application Ser. No. 11/651,623, filed Jan. 10, 2007, entitled "Hardware Specific Code Generation." The contents of U.S. application Ser. No. 11/651,623 are incorporated herein by reference in its entirety.

BACKGROUND

Tools exist for producing computer-implemented graphical models. Using the tools, models can be created, edited, and executed within a computing system. These models can then be translated into a high-level language program code, such as C, C++, Ada, Java, or Javascript which may then be compiled into an object code or executable code. The object code or executable code can then be run on computing hardware independent of the graphical modeling tools.

Current graphical modeling tools produce program codes that are generic in nature. For example, current tools may use program code that compiles or may be precompiled into object code or executable code which can be run on a wide variety of computing hardware. A single program code generated from a graphical model may compile into a single object code that may be run on, for example, an x086 Intel-type processor, an AMD-type processor, and a PowerPC-type processor. This generic single program code and the single object code the generic single program code compiles into may not be able to take advantage of specific performance enhancing features of these various processor types because the single program code was generated and compiled to run on all of these processor types.

Single program code compiled into the single object code may not achieve optimal or improvable performance on any computing hardware. Additionally, current graphical modeling tools may produce processor specific program code that may use processor-optimized calls, inlined assembly code, or C/C++ language extensions in order to access the hardware specific optimization capabilities. For example, Simulink® and Real-Time Workshop® by The MathWorks, Inc. of Natick, Mass. (hereinafter "The MathWorks") may provide target specific optimization capabilities for the C90 (ISO/IEC 9899:1990) and C99 (ISO/IEC 9899:1999) C-language standards as well as the GNU compiler tool chain. Additionally, target specific optimizations may be achieved with Simulink and Real-Time Workshop by creating a user-defined S-function block. However, these existing approaches may not be configurable, customizable or extensible through a documented API. Furthermore, their capability may be limited to predefined replacements and are not generally applied across all graphical modeling constructs.

SUMMARY

One embodiment includes a computer-implemented method for generating code based on a graphical model. The method includes translating the graphical model into a graphical model code, the graphical model code including a first graphical model code function; performing a lookup of the first graphical model code function in a hardware specific library, the hardware specific library comprising a plurality of relationships between graphical model code functions and hardware specific functions, where the first graphical model code function is one of the graphical model code functions; obtaining a matched hardware specific function based on the lookup, wherein the matched hardware specific function is one of the hardware specific functions from the hardware specific library; and modifying the graphical model code based on the matched hardware specific function.

One embodiment includes a computer-readable medium including software instructions, which when executed by a computer system causes the computer system to perform operations for a method for generating code based on a graphical model. The computer-readable medium includes: instructions for translating the graphical model into a graphical model code, the graphical model code including a first graphical model code function; instructions for performing a lookup of the first graphical model code function in a hardware specific library, the hardware specific library comprising a plurality of relationships between graphical model code functions and hardware specific functions, where the first graphical model code function is one of the graphical model code functions; instructions for obtaining a matched hardware specific function based on the lookup, wherein the matched hardware specific function is one of the hardware specific functions from the hardware specific library; and instructions for modifying the graphical model code based on the matched hardware specific function.

One embodiment includes a system for code generation of a graphical model. The system includes: means for translating the graphical model into a graphical model code, the graphical model code including a first graphical model code function; means for performing a lookup of the first graphical model code function in a hardware specific library, the hardware specific library comprising a plurality of relationships between graphical model code functions and hardware specific functions, where the first graphical model code function is one of the graphical model code functions; means for obtaining a matched hardware specific function based on the lookup, wherein the matched hardware specific function is one of the hardware specific functions from the hardware specific library; and means for modifying the graphical model code based on the matched hardware specific function.

Further features of the invention, as well as the structure and operation of various embodiments of the invention, are described in detail below with reference to the accompanying drawings.

BRIEF DESCRIPTION OF THE DRAWINGS

The foregoing and other features of the embodiments will be apparent from the following, more particular description of exemplary embodiments of the invention, as illustrated in the accompanying drawings wherein like reference numbers generally indicate identical, functionally similar, and/or structurally similar elements. The left most digits in the corresponding reference number indicate the drawing in which an element first appears.

FIGS. 12A-12C depict an exemplary embodiment of an application programming interface (API) for creating a hardware specific library.

FIG. 13 depicts an exemplary second API for registering hardware specific libraries with the graphical model.

DEFINITIONS

Figure 1:
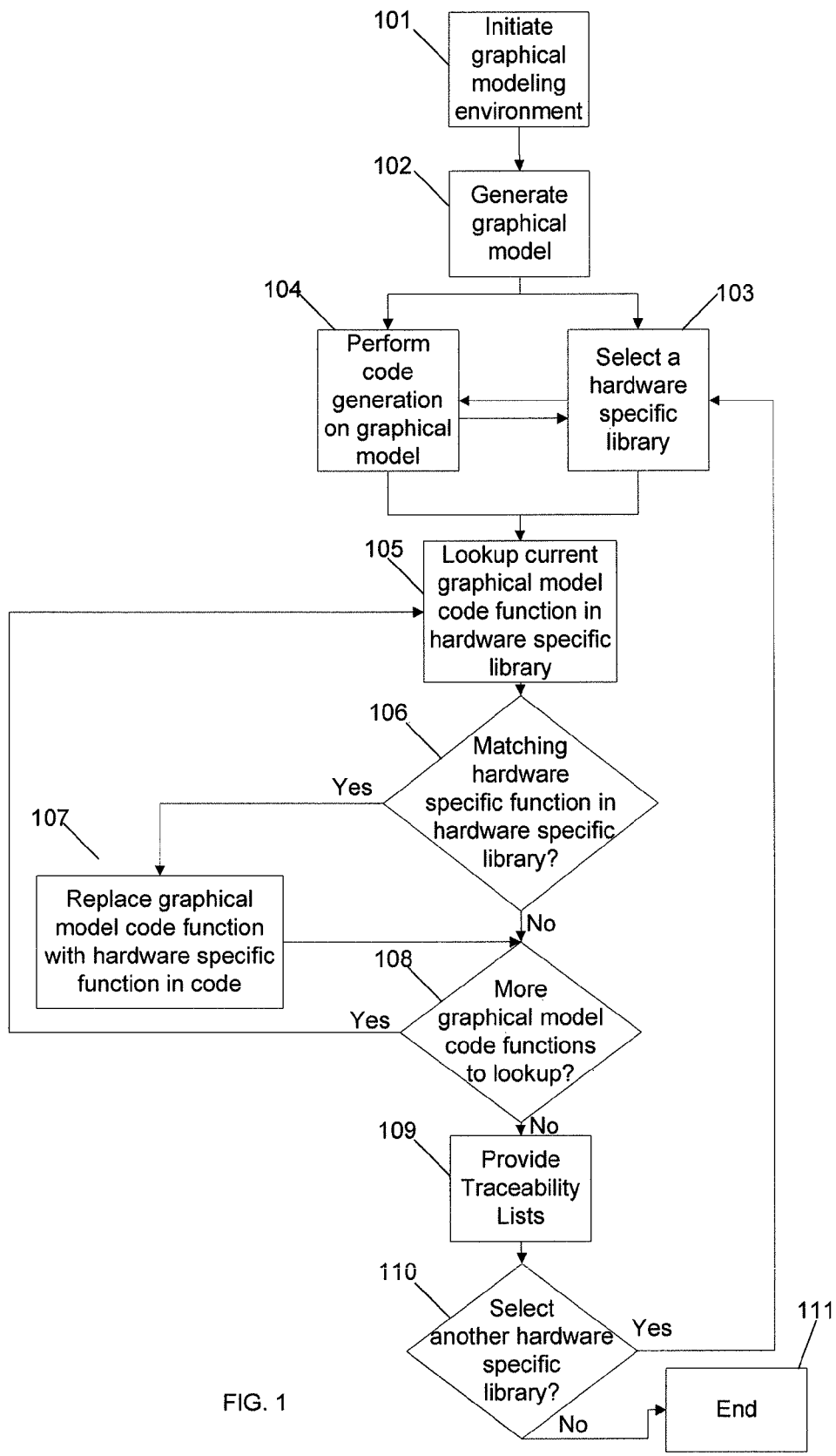
FIG. 1 depicts exemplary processing for generating hardware specific code from a graphical model.

In describing the invention, the following definitions are applicable throughout (including above).

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with interne access; a hybrid combination of a computer and an interactive television; a portable computer; a tablet PC; a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a System on Chip (SoC) and a Multiprocessor System-on-Chip (MPSoC); an optical computer; and an apparatus that may accept data, may process data in accordance with one or more stored software programs, may generate results, and typically may include input, output, storage, arithmetic, logic, and control units. "Software" may refer to prescribed rules to operate a computer. Examples of software may include: software; code segments; instructions; applets; pre-compiled code; compiled code; computer programs; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a memory chip; and/or other types of media that can store machine-readable instructions thereon.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices (e.g., network devices that may include gateways, routers, switches, firewalls, address translators, etc.) that may be connected by communication facilities. A network may involve permanent connections such as cables or temporary connections such as those that may be made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); a metropolitan area network (MAN); a body area network (BAN); and a combination of networks, such as an interne and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

A "processor" may refer to the hardware device such as a microprocessor, microcontroller, digital signal processor, FPGA, SoC, MPSoC, ASIC, ASIP, graphical processing unit (GPU), or chip which executes machine instructions contained in object code. A "processor" may refer to a more specific form of the term "computer" as it refers to the device within a computer which executes the machine instructions.

A "target" may refer to a hardware device or software component (e.g., an object) that may receive information from a sending device or software component. For example, a target may refer to a combination that includes a compiler and a processor, where the combination can define a high-level programming environment. For example, a given processor may have specific hardware capabilities such as saturated arithmetic support for which there is no direct mapping to the standard ISO-C/ANSI-C high-level language. Compiler vendors may provide library functions, callable from C code, or may extend the C language by adding custom qualifiers to be used when declaring variables in order to fully leverage the hardware capabilities. Thus, given a combination of compiler and processor, program code for that specific target environment may be generated using a hardware specific library.

DETAILED DESCRIPTION OF EMBODIMENTS

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the invention is not intended to be limited to the specific terminology so selected. A person skilled in the relevant art will recognize that other components and configurations may be used without parting from the spirit and scope of the invention. It is to be understood that each specific element includes all technical equivalents that operate in a similar manner to accomplish a similar purpose. The examples and embodiments described herein are non-limiting examples.

Figure 2:
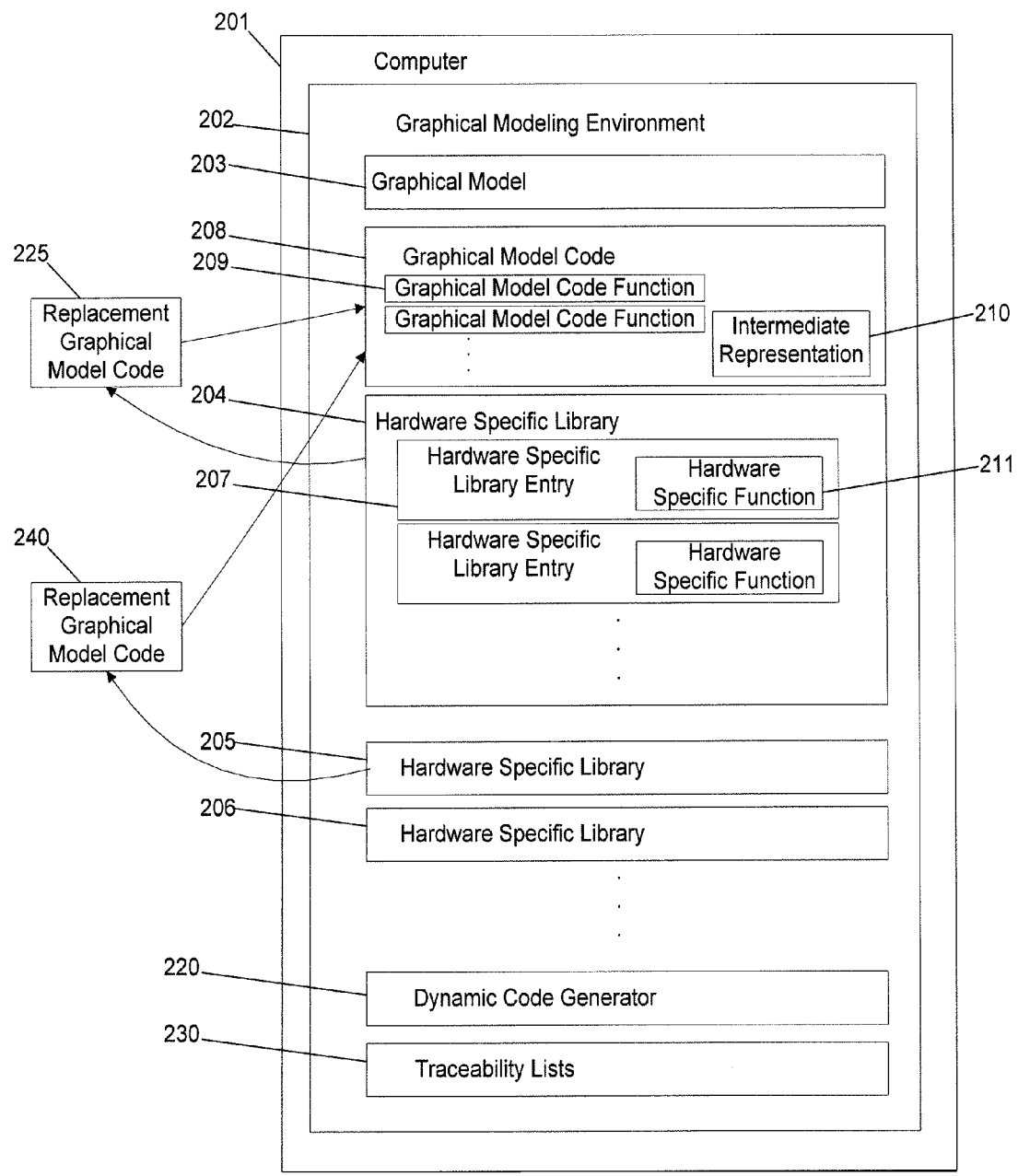
FIG. 2 depicts an exemplary embodiment of an apparatus for generating hardware specific code from a graphical model.

FIG. 1 depicts an exemplary processing for generating hardware specific code from a graphical model. This processing implementation may be referred to as the code generation process. FIG. 2 depicts an exemplary embodiment of an apparatus for generating hardware specific code from a graphical model.

In block 101, a graphical modeling environment 202 may be initiated on a computer 201. The graphical modeling environment 202 may be based on, for example, Simulink® by The MathWorks, Inc. of Natick, Mass. (hereinafter "The MathWorks") or Stateflow® by The MathWorks. The graphical modeling environment 202 may be an environment in which a graphical model 203 or parts of a graphical model 203 may be executed. Examples of a graphical modeling environment 202 may include: Simulink® by The MathWorks, Inc.; Stateflow® by The MathWorks; SimEvents™ by The MathWorks; SimMechanics by The MathWorks; LabView® by National Instruments, Inc.; VisSim by Visual Solutions, Inc.; Dymola by Dynasim; SoftWIRE by Measurement Computing; WiT by DALSA Coreco; VEE Pro or SystemVue by Agilent; Gedae by Gedae, Inc.; Scicos from The French National Institute for Research in Computer Science and Control (INRIA); aspects of a Unified Modeling Language (UML) or SysML environment; among others. The graphical modeling environment 202 may be an executable modeling environment for a graphical executable model.

In block 102, a graphical model 203 may be generated in the graphical modeling environment 202. The graphical model 203 may be generated by being, for example, created in or loaded into the graphical modeling environment 202. The graphical model 203 may be a model of a system built using block elements corresponding to the graphical modeling environment 202 and may possibly be executed. For example, the graphical modeling environment 202 may contain a block element to represent the clutch control system of a car.

The graphical model 203 may include multiple domains such as time based, data flow or physics modeling. In one exemplary embodiment, the graphical model 203 may include, for example, text-based modeling code, finite state machine modeling (e.g. statecharts), physical systems modeling or UML diagrams such as sequence diagrams and/or may operate on top of a text-based modeling environment. In another exemplary embodiment, the graphical model 203 may have the ability to include code, such as, for example, legacy code, provided by the user. Flow may proceed to block 103 or block 104.

In one exemplary embodiment, the graphical model may be a time-based block diagram. In one exemplary embodiment, the time-based block diagram may be executed. In another exemplary embodiment, the time-based block diagram may be processed before code is generated from the time-based block diagram. This processing may include preparing data structures and/or evaluating parameters, configuring and/or propagating block characteristics, determining block connectivity, performing block reduction and block insertion, etc. During the configuration and propagation of block and/or port/signal characteristics, the compiled attributes (e.g., dimensions, datatypes, complexity, sample time, etc.) of each block (e.g., and/or ports) may be setup on the basis of corresponding functional attributes and/or the attributes of blocks (and/or ports) that are connected to the given block through lines.

In one exemplary embodiment, attribute setup may be performed through a process during which block functional attributes "ripple through" the block diagram from one block to the next following signal connectivity (referred to herein as "propagation"). Blocks that are implemented to be compatible with a wide range of attributes may adapt their behavior in accordance with the attributes of the blocks connected to them.

Based on actual block connectivity (determined by, for example, removing blocks that have no functional bearing but only a graphical implication), the block diagram may be further modified, for example, to run faster, by performing block reduction and/or insertion. During this step, blocks may be inserted or a set of blocks may be removed or reduced to a single equivalent block. For example, a signal copy block may be automatically inserted in order to make contiguous memory copies of signals that are made up of disjoint memory sections.

The way in which blocks are interconnected in the block diagram may or may not represent an order in which the equations (e.g., execution methods) corresponding to the individual blocks will be solved (e.g., executed). In one exemplary embodiment, an actual order may be partially determined during the sorting step performed during compilation.

The first step in sorting may involve transforming the time-based block diagram into a compiled (e.g., in-memory) directed graph having, for example, arcs and vertices. The vertices may be derived from some of the blocks that have a functional bearing. For instance, blocks with only a graphical implication and/or reduced blocks may not appear in the directed graph. The arcs may represent data dependencies between the vertices and may correspond to the data dependencies in the block diagram. In addition, data dependencies may be added to capture implicit dependencies. For example, in one exemplary embodiment all inputs to a Function-Call subsystem may be implicit data dependencies to the owner (e.g., caller) block. In another exemplary embodiment, a portion of the inputs to a Function-Call subsystem may be implicit data dependencies to the owner block. The graph may be used to sort the blocks into a linear sorted list.

Sorting may also take into consideration user specified dependencies between the blocks, such as, for example, priorities and placement groups. A block priority may specify the order in which the equations associated with a block are evaluated with respect to other blocks. Placement groups may be used as a way of causing each class of block execution methods for a specified set of blocks to be "placed together" in the block method execution lists.

During the linking stage, block method execution lists may be derived from the sorted list to allow for execution of the block diagram. Each block method execution list may be a list of block methods that are to be executed in a sequence when each execution method within the list has a sample hit. In multi-tasking mode, the lists may be further partitioned when block diagrams have blocks with different sample rates.

Those skilled in the art will recognize that while the block method execution lists may be derived from the sorted list, the block method execution lists may not necessarily correspond one-to-one with the sorted lists because some blocks may not have a corresponding method and some block may have an "owner" block that triggers their execution.

In block 103, a hardware specific library 204 may be selected. The hardware specific library 204 may be selected by selecting from a list of available hardware specific libraries 204, 205, 206, etc. available in the graphical modeling environment 202. The hardware specific library 204 may be selected through a graphical user interface in the graphical modeling environment 202, or by text-based commands entered into the graphical modeling environment 202. A hardware specific library 204 may be defined for a specific target environment (compiler and processor) such as for the Texas Instrument Intrinsic library for a TI C28xx processor used with Code Composer Studio, or for a specific industry standard interface API such as SAL, BLAS or MPLIB, or for a programming language standard such as DSP-C, System-C.

The hardware specific library 204 may be directed towards a particular type of computing hardware and may include specific functions 211. Hardware specific functions 211 may be functions or operations that have been designed to be compiled into object code for execution on a particular type of computing hardware. For example, the hardware specific library 204 may contain hardware specific functions 211 created for use on an Intel Dual Core processor. Another hardware specific library 205 may contain hardware specific functions 211 created for use on Transmeta Crusoe processor. Still other hardware specific libraries 206, etc. may contain hardware specific functions 211 created for use on Intel x086 processors, AMD-type processors, PowerPC-type processors, etc. Hardware specific functions 211 may be functions or operations containing instrumentation code, which may allow for data collection.

A hardware specific function may refer to a C or C++ language function which may be callable from a C or C++ program. It may also refer to primitive constructs in the programming language such as all standard C or C++ operators including assignment (=), add (+), subtract (−), multiply (*), divide (/), shift (<<, >>) and data type casts. A target environment may have replacements for these standard operators or for C-callable functions. These replacements may be, for example, replacements which run faster on the target. If flow proceeds from block 102 to block 103, flow may proceed to block 104 or block 105.

Figure 3:
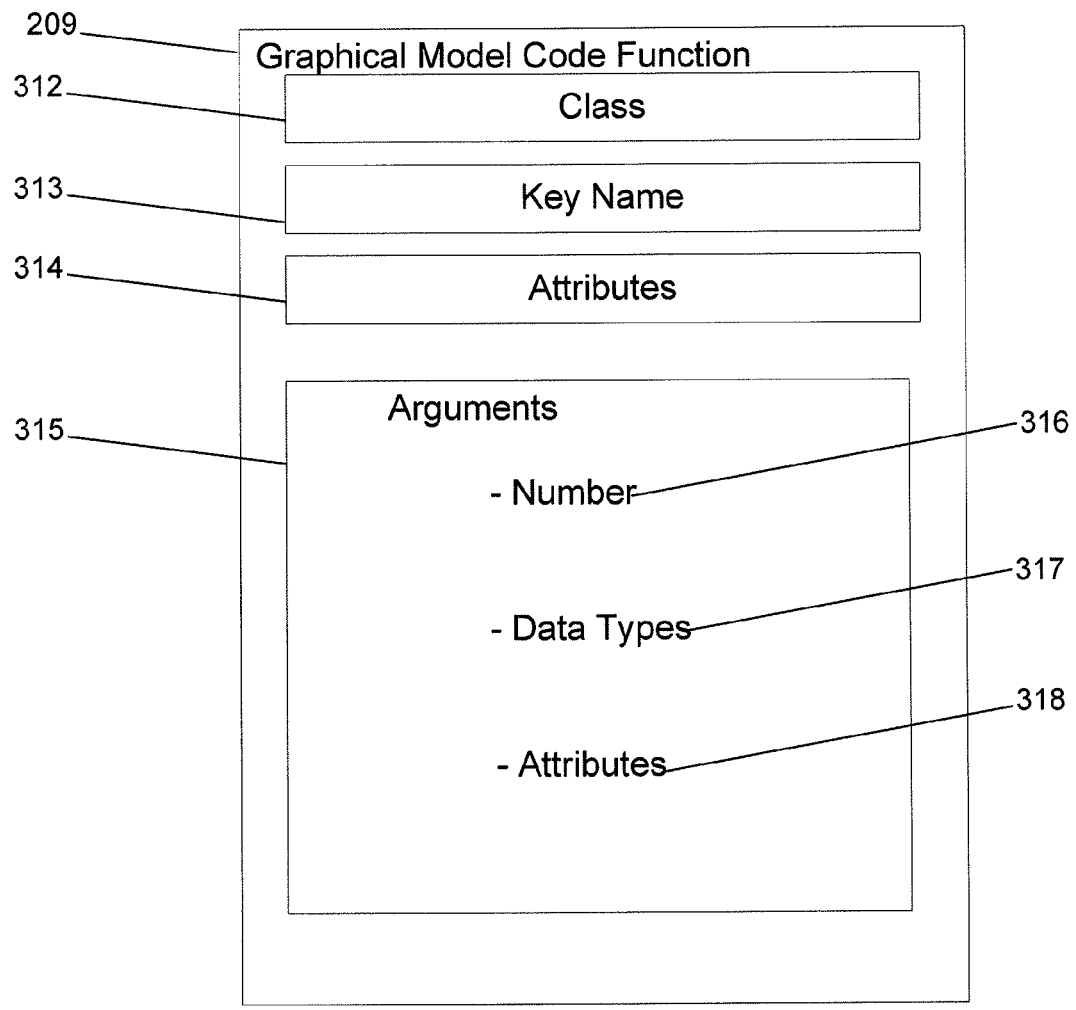
FIG. 3 depicts an exemplary embodiment of a hardware specific function entry in a hardware specific library.

FIG. 3 depicts an exemplary embodiment of the graphical model code function. The graphical model code 208 may contain a graphical model code function 209 such as a lookup table function block or device driver function block. In another example, the graphical model code 208 may contain a subsystem block or a group of related blocks that perform a specific algorithm or operation. Whether a hardware specific function 211 should be used and which hardware specific function 211 should be may be indicated by a user by selecting an option on the subsystem block or group of related blocks. The latter could be indicated implicitly, by setting properties or providing constraints. This selection could be implemented, for example, by using a configurable subsystem. The graphical model code function 209 may be defined by various properties. These properties may be, for example, a function class 312, a key name 313, and other function attributes 314 such as the saturation and rounding modes of a function, or an attribute identifying whether the function 209 is an inlined function 209.

The graphical model code function 209 may contain argument data 315. Argument data 315 may include the number of arguments 316, the data types 317 of arguments, and other attributes 318 of the arguments, for example, the number of bits needed to represent the argument. The attributes for the arguments may also include characteristics that are not present in programming languages such as C or C++. For example, arguments may be defined as fixed point integers and have attributes such as Slope and Bias or Fraction Length or may be defined as matrices and have corresponding attributes such as Number of Dimensions and Dimensions.

Figure 4:
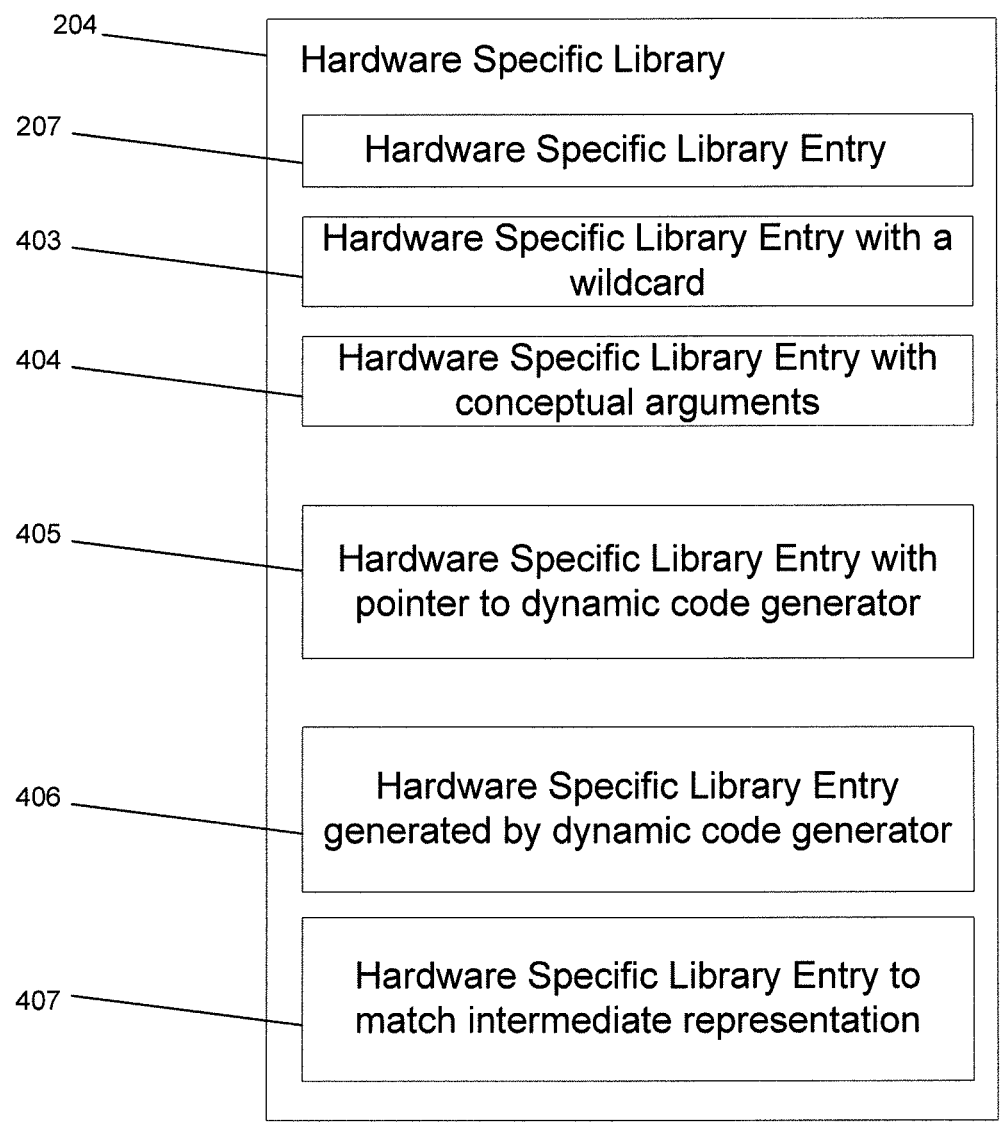
FIG. 4 depicts an exemplary embodiment of a hardware specific library.
Figure 5:
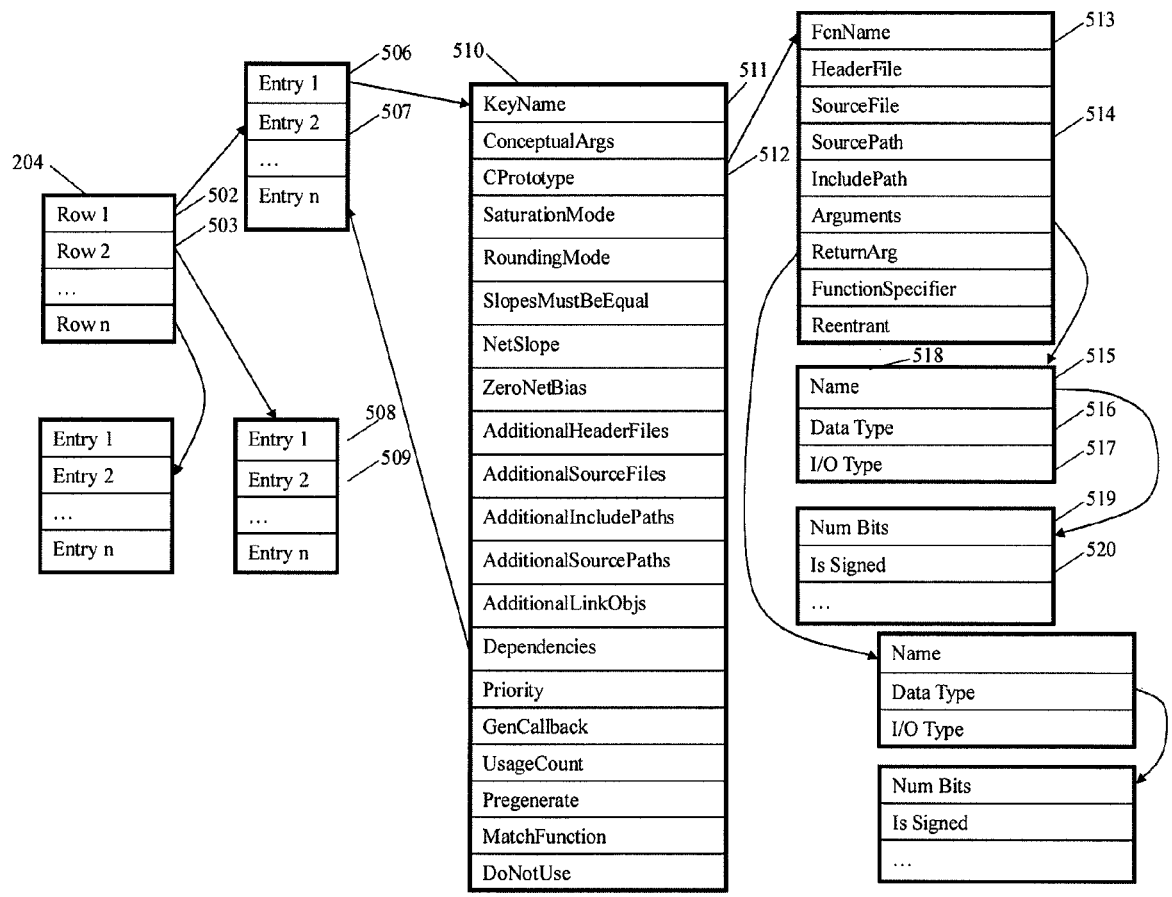
FIG. 5 depicts another exemplary embodiment of a hardware specific library.

FIGS. 4 and 5 depict exemplary embodiments of a hardware specific library. Referring to FIG. 5, the hardware specific library may be divided into a number of rows such as rows 502, 503, etc. Each row in the hardware specific library 204 may contain a number of hardware specific library entries 207. For example, the row 502 contains hardware specific library entries 505, 506, etc. and the row 503 contains hardware specific library entries 508, 509, etc. One skilled in the art will recognize that other realizations of hardware specific library are possible, such as by using a textual file based approach with XML, or by graphically describing the hardware specific library. The hardware specific library 204 may contain hardware specific library entries 207 of varying types. A hardware specific library entry 207 may be replaced by another hardware specific library entry, in order, for example, to allow a performance comparison between the hardware specific functions contained in the hardware specific entries.

For example, referring to FIG. 4, the hardware specific library 204 may contain a hardware specific library entry 403 that contains a wildcard. The hardware specific library 204 may also contain a hardware specific library entry 404 with conceptual arguments, as discussed below in FIG. 7, a hardware specific library entry 405 that may contain a pointer to a dynamic code generator 220 as discussed below in FIG. 8, a hardware specific library entry 406 that was generated by a dynamic code generator 220 and a hardware specific library entry 407 that may contain an intermediate representation pattern that may be matched to an intermediate representation translated from the graphical model code 208.

Each hardware specific library entry 207 may contain a list of various properties of the hardware specific function 211 contained in the hardware specific library entry 207. For example, hardware specific library entry 506 points to list 510 containing the function key name 511 and the function prototype 512. The function prototype 512 may point to a second list containing further properties of the hardware specific function 211. For example, the prototype 512 points to a second list 513, containing the name of the hardware specific function 211, the location of the file in which the source code for hardware specific function 211 is located, and the argument data 508 for each argument of the hardware specific function 211.

Each argument for a hardware specific function 211 may have its own set of argument data. Argument data for each function may include the various types of data discussed above in FIG. 3. For example, argument data 518 may contain the name 515 of the argument, the data type 516 of the argument, and the I/O type 517 of the argument. The argument data type may contain further properties relating to the argument data type. For example, the argument data type 516 contains the number of bits 519 needed to represent the data type and an indication 520 of whether or not the data type is a signed data type.

In block 104, the graphical modeling environment 202 may translate the graphical model 203 into the graphical model code 208. The process of translation is used by modeling tools, such as Simulink® by The MathWorks to create a graphical model code that may be compiled into an executable computer program from a graphical model. The elements that make up the graphical model are represented by graphical model code functions written in a programming language. For example, the graphical model code 208 may be, for example, C or C++ code translated from the graphical model 203, in which the elements of the graphical model 203 are represented by C or C++ functions.

The graphical model code 208 for the entire graphical model 203 may be translated before proceeding to block 105. The graphical model code 208 may be for, example, an intermediate representation 210. An intermediate representation 210 may be a representation of a function in a form suitable for optimization by a compiler. For example, an intermediate representation 210 may be in the form of a tree, such as the intermediate representation used by a C or C++ compiler. If flow proceeds from block 102 to block 104, flow may proceed to block 103 or block 105. If the graphical model code 208 for the graphical model 203 has previously been translated and is available, for instance, when flow proceeds from block 110 to block 102, and to block 104, block 104 may retrieve the graphical model code 208 instead of generating a new graphical model code before proceeding to block 105.

In block 105, a graphical model code function 209 from the graphical program model code 208 translated from the graphical model 203 may be looked-up in the hardware specific library 204 to obtain a hardware specific function 211. The graphical model code 208 may include a sequence of functions, for example C++ functions. A function 209 in the graphical model code 208 may be referred to as a graphical model code function 209. The graphical model code function 209 may be looked-up in a data structure, such as the hardware specific library 204 to determine if a matching hardware specific function exists.

The lookup process may include matching a plurality of properties of the graphical model code function 209 from the graphical model code 208 to properties of a hardware specific library entry 207. The properties matched by the lookup process may include, for example, referring to FIG. 3, function class 312, function key name 313, function attributes 314, and function argument data 315 including the number 316 of arguments, the data type 317 of the function arguments, and the attributes 318 of the function arguments, among others.

The lookup process in block 105 may be hierarchical, such that the properties of a graphical model code function 209 are arranged in hierarchical fashion and then matched with hardware specific library entries 207 according to that hierarchy. For example, a graphical model code function 209 may have a hierarchy in which its properties are in the order: class, key name, attributes, arguments. When the graphical model code function 209 is looked up in the hardware specific library 204, the hardware specific library 204 may first determine which hardware specific entries 207 in the hardware specific library 204 match the class of the graphical model code function 209. The hardware specific library 204 may then determine which of those hardware specific entries that match the class of the graphical model code function 209 also match the key name of the graphical model code function 209, and so on until each attribute of the graphical model code function 209 has been used and a matching hardware specific function 211 has either been found or not found.

Figure 6:
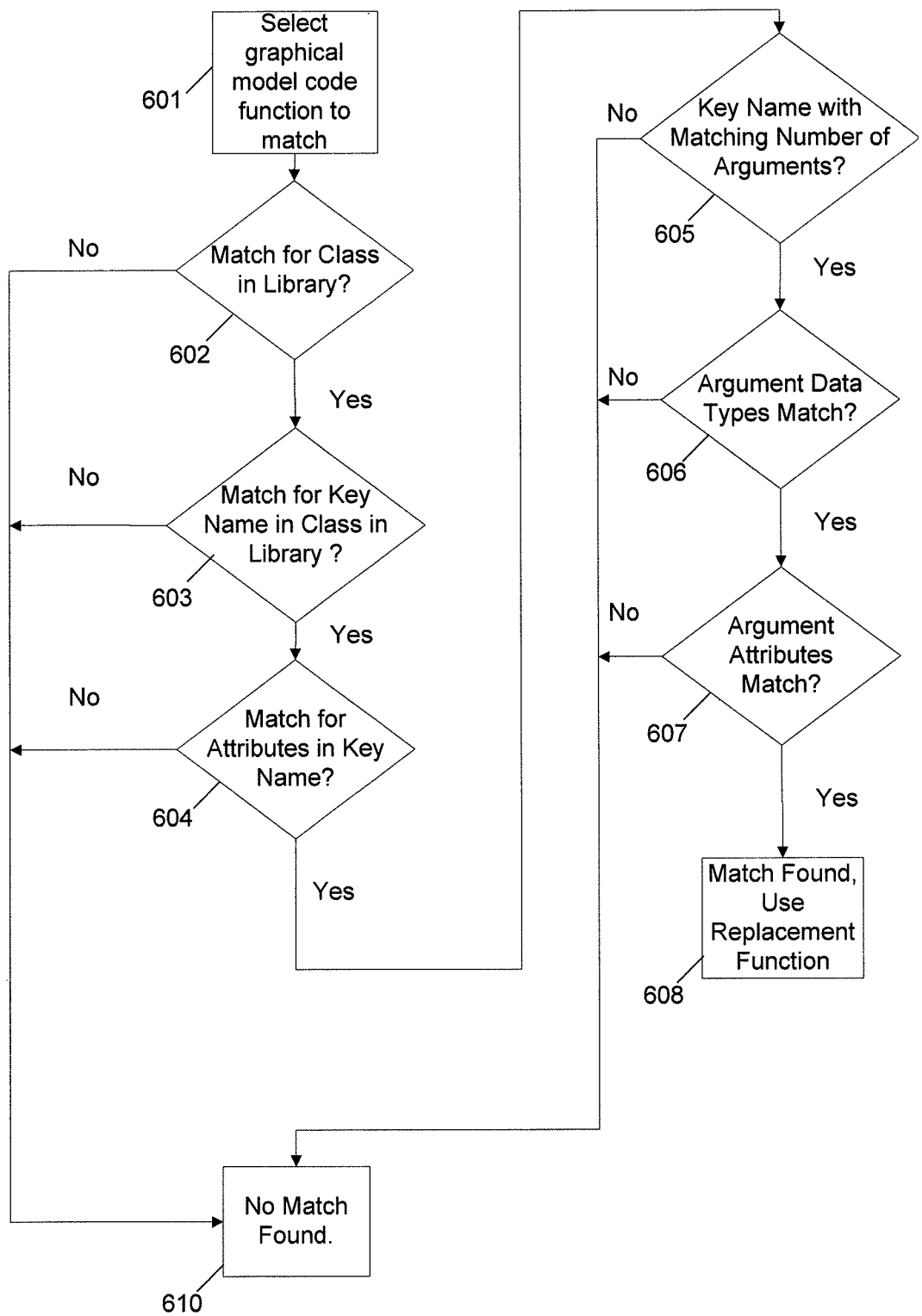
FIG. 6 depicts an exemplary embodiment of a hierarchical lookup process

FIG. 6 depicts an exemplary embodiment of a hierarchical lookup process.

In block 601, the function from the graphical model code may be selected for matching, such as graphical model code function 209.

In block 602, the hardware specific library 204 may be searched to determine if at least one of the hardware specific library entries 207 in the library 204 contains a hardware specific function 211 that is of the same class 212 as the graphical model function 209 selected in block 601. If no match is found for the function class 312, flow proceeds to block 610 and ends. If at least one match is found, flow proceeds to block 603.

In block 603, the set of hardware specific library entries found to be matches in block 602 may be searched to determine if at least one of the hardware specific library entries in the set contains a hardware specific function 211 that matches the key name 313 of the graphical model code function. If no match is found for the function 209 key name 313, flow proceeds to block 610 and ends. If at least one match is found, flow proceeds to block 604.

In block 604, the set of hardware specific library entries found to be matches in block 603 may be searched to determine if at least one of the hardware specific library entries in the set contains a hardware specific function 211 that has attributes, such as, for example, saturation and rounding mode matching the attributes 314 of the graphical model code function 209. If no match is found for the function 209 attributes 314, flow proceeds to block 610 and ends. If at least one match is found, flow proceeds to block 605.

In block 606-608, the arguments 315 of the function 209 are checked, for example, in block 606, the set of hardware specific library entries found to be matches in block 604 may be searched to determine if at least one of the hardware specific library entries contains a hardware specific function 211 which has the same number of arguments as the number 316 of the arguments 315 of the graphical model code function 209. If no match is found for the number 316 of arguments 315 of the graphical model code function 209, flow proceeds to block 610 and ends. If at least one match is found, flow proceeds to block 607.

In block 607, the set of hardware specific library entries found to be matches in block 606 may be searched to determine if at least one of the hardware specific library entries contains a hardware specific function 211 which has arguments whose data types match the data types 317 of the arguments 315 of the graphical model code function 209. If no match is found for the argument data types 317 of graphical model code function 209, flow proceeds to block 610 and ends. If at least one match is found, flow proceeds to block 608.

In block 608, the set of hardware specific library entries found to be matches in block 607 may be searched to determine if at least one of the hardware specific library entries contains a hardware specific function 211 whose arguments have the same attributes as the argument attributes 318 of the graphical model code function 209. If no match is found for the argument attributes 318 of the graphical model code function 209, flow proceeds to block 610 and ends. If at least one match is found, flow proceeds to block 609.

In block 609, the hardware specific function 211 that matches the graphical model code function 209 may located, which provides the answer for the decision in block 106.

In block 610, no match may be found, providing the answer for the decision in block 106.

The set of hardware specific library entries may contain a priority value such that multiple similar hardware specific functions may be present in the hardware specific library. The entries may be searched based on priority allowing for a priority hierarchy in the matching process. For example, an implementation of a matrix multiply function that runs faster on the target may be available when the arguments (operands) are matrices of dimensions 3×3. There may additionally be a matrix multiply function which supports matrix arguments of any dimension that runs slower on the target. Setting the priority of the 3×3 matrix multiply functions higher than that of the general matrix multiply, the lookup and replacement may choose the more efficient implementation when the arguments are the proper size.

When the arguments are not the proper size to use the most efficient implementation of a hardware specific function, a transformation may be performed on the arguments of a graphical code function in order to create arguments of the proper size. For example, if the graphical code function has arguments that are 6×6 matrices, it may not be directly replaced by the efficient 3×3 matrix multiply function discussed above because the arguments are the wrong size. In this case, a transformation may be performed to decompose each 6×6 matrix into 4 3×3 matrices. Operations on the 3×3 matrices may then be performed by the efficient hardware specific function. Hardware specific libraries may be created in a modular way, for example including of a base hardware specific library which provides all general hardware functions and additional increasingly specialized hardware specific libraries which may override that base hardware specific library via a priority mechanism.

Likewise, weighting values may be supplied that indicate a level of preference for a hardware specific entry to be used, for example, on a normalized scale. A hardware specific entry with weight 0.8 may be preferred over a hardware specific entry with weight 0.5. This allows comparing combinations of hardware specific entries. For example, one combination of hardware specific entries may include a hardware specific entry with weight 0.4 and one hardware specific entry with weight 0.3, whereas an alternative may include one hardware specific entry with weight 0.2 and one with weight 0.9. Depending on the criteria used for selection either one of these may be preferred. For example, if a simple mean is used to decide, the combination of entries with weight 0.2 and 0.9 would be preferred. If, for example, minimizing the variance would be preferred, the combination of hardware specific entries with weight 0.4 and 0.3 would be preferred. The alternative combinations do not need to include the same number of entities.

Matching during the lookup process may include wildcards by using a hardware specific library entry 403 with a wildcard. The matching process may also include wildcards by applying wildcards to the properties of the graphical model code function 209, for example, the key name 313. The use of wildcards is well known in the art of regular expressions. A wildcard may be shown, for example, with the use of the * (i.e., asterisk) character or the ? (i.e., question mark) character. A wildcard may be added to an attribute in order to allow for non-exact matching.

For example, a graphical model code function with a key name of cos ( ) may have a wildcard on the key name. The wildcard key name *cos* ( ) or *cos ( )* may match a hardware specific library entry with a function key name of cosine ( ). A wildcard may also be used in the argument attributes, for example when performing lookups where arguments represent fixed point integers. The attributes of Slope and Bias may be wildcarded. Matching may also occur on derived properties, such as, for example, net-Slope or net-Bias, as calculated across the arguments, and the matching may use wildcards.

For example, wildcards may be used to match a specific list of values or ranges of values such as, for example, net-Slope equal to $2^{-11}$ or net-Bias in the range from 0 to 1. As an additional example, the relative value of an attribute across the arguments may be of importance. For example, the match function may determine if the Slope value for all arguments is the same. Wildcards may provide a mechanism by which a reduced subset of entries may be needed to match a potentially large number of possible combinations for a given class of function or operation. In the preceding example, there may be, for example, many thousands of possible fixed point scalings of arguments used in a two argument fixed point multiple function. A wildcard may allow for only a single or few entries to be needed to support matching and replacement of this large number of fixed point scalings.

The lookup process in block 105 may perform matching based on the property of conceptual arguments. An entry 404 in the hardware specific library 204 may have associated with it a property of conceptual arguments as well as actual arguments. Conceptual arguments are sets of arguments that may be used to match the argument properties of a function being looked up such that a function may be matched to a hardware specific library entry even if the function arguments do not match exactly with the actual argument properties of the library entry. Conceptual arguments may allow a library entry to match a wider variety of graphical program code functions. Conceptual arguments may match a library entry to a function with a different number of arguments than the actual arguments of the entry. Conceptual arguments may match a function with arguments of a different data type than the arguments of the entry. For example, the graphical program code may contain a function A:

double *outarg matrix_multiply(double *inarg1,
        double *inarg2)

The hardware specific library may contain an entry with a hardware specific function B:

void matrix_multiply(double *inarg1_real, double
        *inarg1_complex, double *inarg2_real, double
        *inarg2_complex, double *outarg_real, double
        *outarg_complex)

If a lookup is performed in the hardware specific library 204 on the graphical model code function A, and the hardware specific library entry 207 does not contain conceptual arguments for the hardware specific function B, the lookup may not match the graphical model code function A to any library entry 207, including the entry 207 for the above hardware specific function B. In the case of the above exemplary hardware specific function B, the number of arguments does not match between the hardware specific function B and the graphical model code function A. The hardware specific function B has four arguments, while the graphical model code function A has only two. If the hardware specific library entry 207 does contain conceptual arguments, the lookup may match the graphical model code function A to the library entry 207 for the hardware specific function B if one set of conceptual arguments from the entry matches the arguments from the graphical model code function A. The hardware specific library entry 207 may contain the conceptual argument property:

(double *inarg1_real, double *inarg2_real)

The graphical model code function A may now be matched to the hardware specific library entry 207 containing hardware specific function B because the hardware specific function B has conceptual arguments that match the arguments of the graphical model code function A in number, data type, and attributes.

Figure 7:
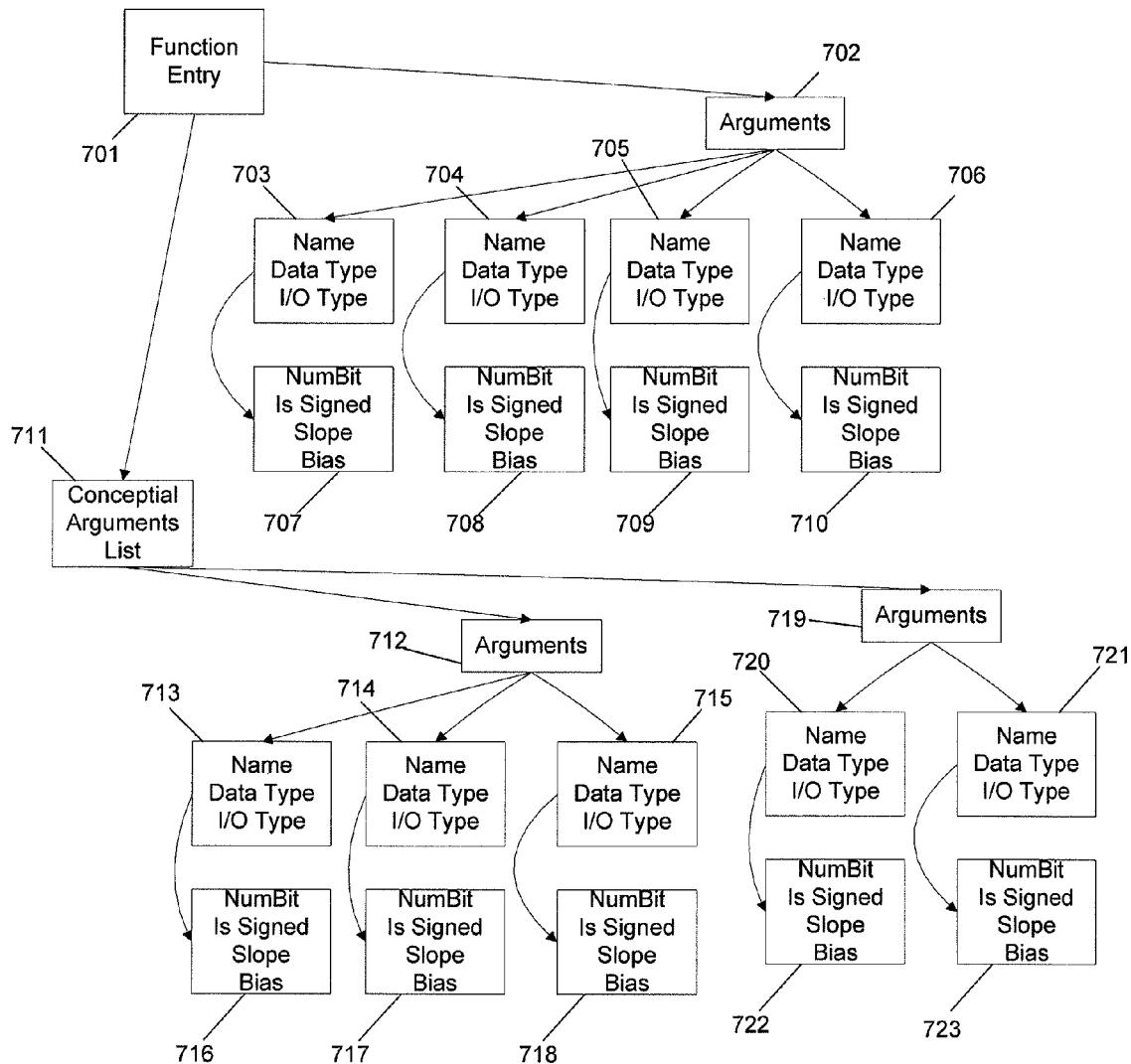
FIG. 7 depicts an exemplary embodiment of a hardware specific library entry having conceptual arguments.

FIG. 7 depicts an exemplary embodiment of a hardware specific library entry that has conceptual arguments. The hardware specific library entry 701 may contain information about a hardware specific function 211. This information may include a list 702 of the actual arguments 703, 704, 705 and 706 used by the hardware specific function. The actual arguments 703, 704, 705 and 706 may further contain data type information 707, 708, 709 and 710 about the data types used by the actual arguments 703, 704, 705, and 706, respectively. In addition to the list 702 of actual arguments, the hardware specific library entry may include a list of conceptual argument sets 711. The conceptual arguments sets lists 711 may contain conceptual argument lists 712 and 719. The conceptual arguments list 712 may contain conceptual arguments 713, 714 and 715, which may contain conceptual data type information 716, 717, and 718, respectively. The conceptual arguments list 719 may contain the conceptual arguments 720 and 721, which may contain conceptual argument data type information 722 and 723, respectively.

The lookup in block 105 may also match the graphical model code function 209 to the hardware specific library entry 405 containing a pointer to a dynamic code generator 220. This match may occur when the graphical model code function 209 is matched to entry properties which designate it as a function that can be replaced by the dynamic code generator 220. This match may occur when the graphical model code function 209 fails to match any other entry in the hardware specific library 204. The dynamic code generator 220 may generate hardware specific functions that may be placed into the graphical model code 208.

The hardware specific functions generated by the dynamic code generator 220 may also be inserted into the hardware specific library 204 as a new library entry 406. Additionally, the dynamic code generator 220 may recursively access the hardware specific library 204, performing a lookup in order to implement its intended algorithm. For example, an entry 207 in the hardware specific library 204 for the hardware specific function 211, such as, for example, a Fast Fourier Transform (FFT), may be pointed to by the dynamic code generator 220 to create the function. To implement the FFT algorithm, a lookup for a trigonometric function such as cosine may also be required. One skilled in the art will recognize that an arbitrary number of levels of recursive lookups could occur in this manner as well as an arbitrary numbers of lookups occurring at a given level.

A given hardware specific entry 207 or set of entries may also be configured to be pre-generated outside of the context of a graphical model code generation session. Additionally, the location (e.g., directory) to which the hardware specific functions should be pre-generated may be configured. This may enable separation of the generation of hardware functions from the generation of the graphical model code from a graphical model. This also may allow, for example, for the qualification activities to proceed on the generated hardware specific functions independent of qualification activities on the graphical model code generated from the graphical model. Additionally, a given hardware specific library entry or set of entries may be configured as "do not use". This may avoid the use of unqualified functions or functions that are not currently supported in a target environment.

Figure 8:
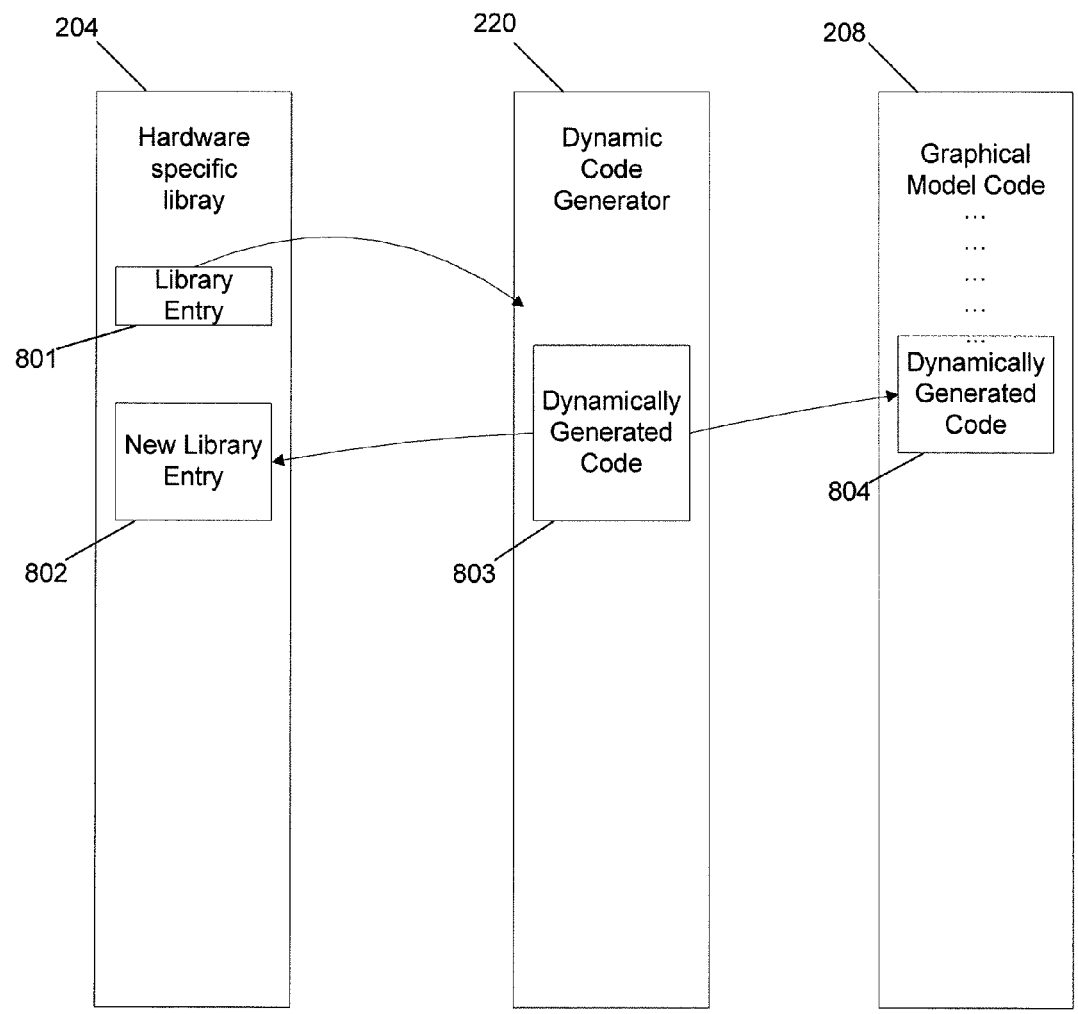
FIG. 8 is an exemplary embodiment of a process for using a dynamic code generator.

FIG. 8 is an exemplary embodiment of a process for using a dynamic code generator. The hardware specific library, 204, may contain an entry 801 that points to the dynamic code generator 220 instead of a hardware specific function. When the entry 801 is matched to a graphical model code function 209 (not shown) from the graphical model code 208, the entry 801 may trigger the dynamic code generator 220. The dynamic code generator 220 may produce dynamically generated code 803, for example, code that may be used to replace the graphical model code function that matched the entry 801. This code may be placed into the hardware specific library 204 as a new entry 802. The code may also be placed into the graphical model code 208 as replacement dynamically generated code 804 for the graphical model code function that matched the library entry 801.

The lookup in block 105, may also be based on an intermediate representation 210. The graphical model code 208 may be translated into an intermediate representation 210. Matching may be performed by looking up intermediate representation 210 patterns translated from the graphical model code 208 in the hardware specific library 204. The hardware specific library entry 207 may contain a property defining which intermediate representation 210 patterns the entry 207 may match.

Referring back to FIG. 1, in block 106, if a match for the graphical model code function 209 has been found in the hardware specific library 204, flow proceeds to block 107. If no match has been found, flow proceeds to block 108.

In block 107, the graphical model code function 209 or intermediate representation 210 may be replaced in the graphical model code 208 with the hardware specific function 211 from the entry 207 in the hardware specific library 204 that the graphical model code function 209 matched. The replacement of graphical model code functions 209 or intermediate representations 210 with hardware specific functions 211 may result in the creation of a replacement graphical model code 225. The hardware specific function 211 may be placed into the graphical model code 208 itself, overwriting the original graphical model code function 209. The hardware specific function 211 may be translated into an intermediate representation 210 before being placed into the graphical mode program code.

Figure 9:
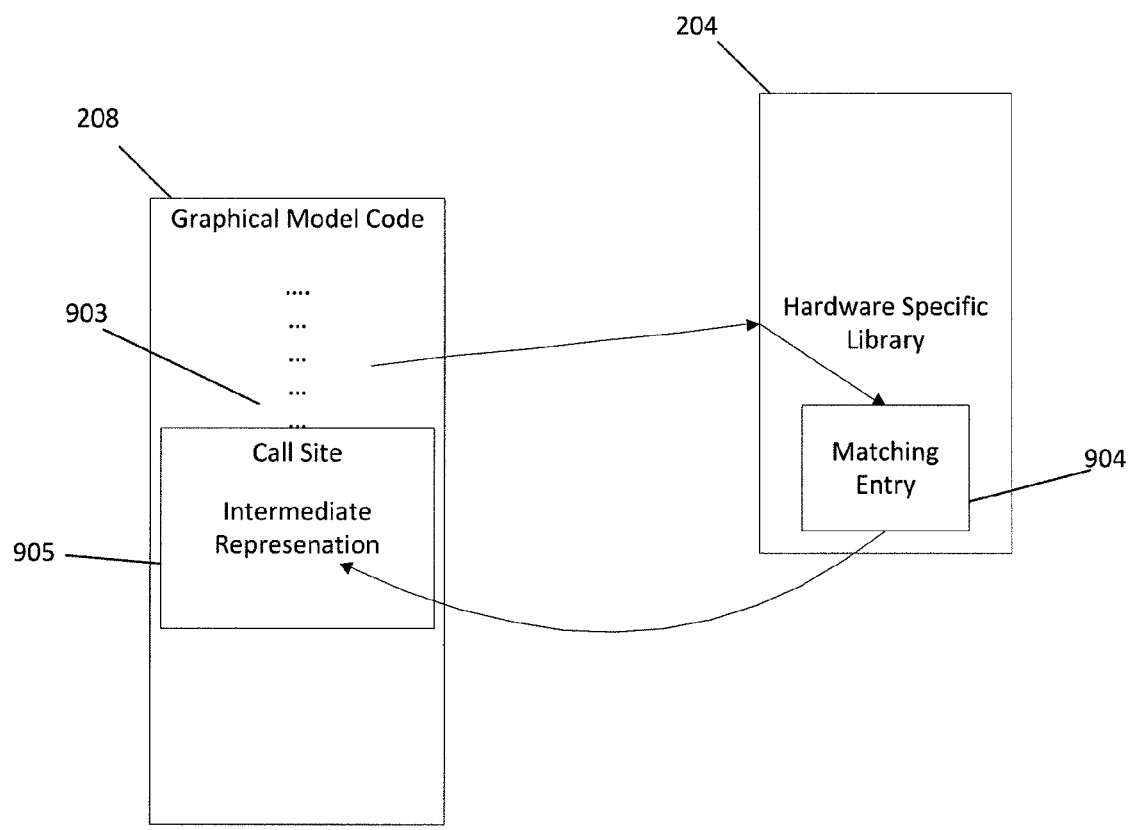
FIG. 9 depicts an exemplary embodiment that can include placing an intermediate representation translation of a hardware specific function into a graphical model code.

FIG. 9 depicts an exemplary embodiment of placing the intermediate representation translation of a hardware specific function into a graphical model code. The graphical model code 208 may contain a graphical model code function 209 at a call site 903. A call site may refer to the location within the graphical model code 208 of the graphical model code function 209 being looked up in the hardware specific library 204. The graphical model code function 209 at the call site 903 may be looked up in the hardware specific library 204. A matching hardware specific library entry 207 may be found in the hardware specific library 204. Instead of returning the hardware specific function 211 from the matching entry 207 in code form, the hardware specific library 204 may translate the hardware specific function 211 into an intermediate representation 905. The intermediate representation 905 may be returned to the call site 903 of the graphical model code 208 where it may replace the graphical model code function 209 at the call site 903.

In block 108, if there are more functions in the graphical model code remaining to be looked up, flow proceeds back to block 105. Otherwise, flow proceeds to block 109.

In block 109, traceability lists 230 may be provided for the replacement graphical model code 225. In an exemplary embodiment, two traceability lists of graphical model code functions representing functions that were and were not replaced during the matching and replacement may be displayed. These lists may be referred to as traceability lists 230. The first traceability list 230 may contain a listing of each function 209 from the graphical model code 208 that was replaced by a hardware specific function 211 from the hardware specific library 204 during the code generation process. The second traceability list 230 may contain a listing of each function 209 from the graphical model code 208 that was not replaced by a hardware specific function 211 from the hardware specific library 204 during the code generation process. These lists may be created during the matching process in blocks 105 and 106 as the results from a lookup of a graphical model code function 209 are recorded once the lookup is complete.

The traceability lists 230 may be provided by, for example, displaying, storing or sending the lists 230. The traceability lists may be represented in the graphical model by highlighting the blocks for which replacement was done in one color and blocks for which replacement was not done in a different color. Others forms of representing the replacement status of a block in the graphical model may be used such as annotation of the block with a text message or changing the border that defines the block outline. The traceability lists 230 may be displayed separately, or they may be displayed intertwined, listing each function 209 in the order in which it appears in the graphical model code 208.

The traceability lists 230 may be stored as file on a computer readable medium of the computer 201 for later retrieval or for use by the graphical modeling environment 202 or another application or environment of the computer 201. The traceability lists 230 may be sent to another computer system via a network, Reports on the traceability information may also be provided such as percentage replacement. For example, a report may contain information that 86% of all addition (e.g., +) operators were replaced with a hardware specific function 211. Active links such as, for example, hyperlinks may also be provided from the operator in the generated code to the originating block or blocks in the graphical model for which a replacement was done or not done. Similarly, active links may be included in the model to link an element in the model such as, for example, a block, to the related part of the generated code.

Additionally, from a graphical model block, reports on what hardware specific functions were used by that block may be made available, such as, for example, through a right-click context menu or popup menu. In another aspect, the hardware specific library 204 and the hardware specific library entries 207 may contain linkage to a requirements management system in order to provide traceability to the originating requirements document for a design.

Additionally, the availability of a hardware specific function that may be used as a replacement for graphical model code generated from a specific graphical model block may be indicated by a change in the depiction of the graphical model block in a user interface. For example, a graphical model block may be colored green in the user interface to indicate that the current hardware specific library contains a hardware specific function for that graphical model block.

Figure 10:
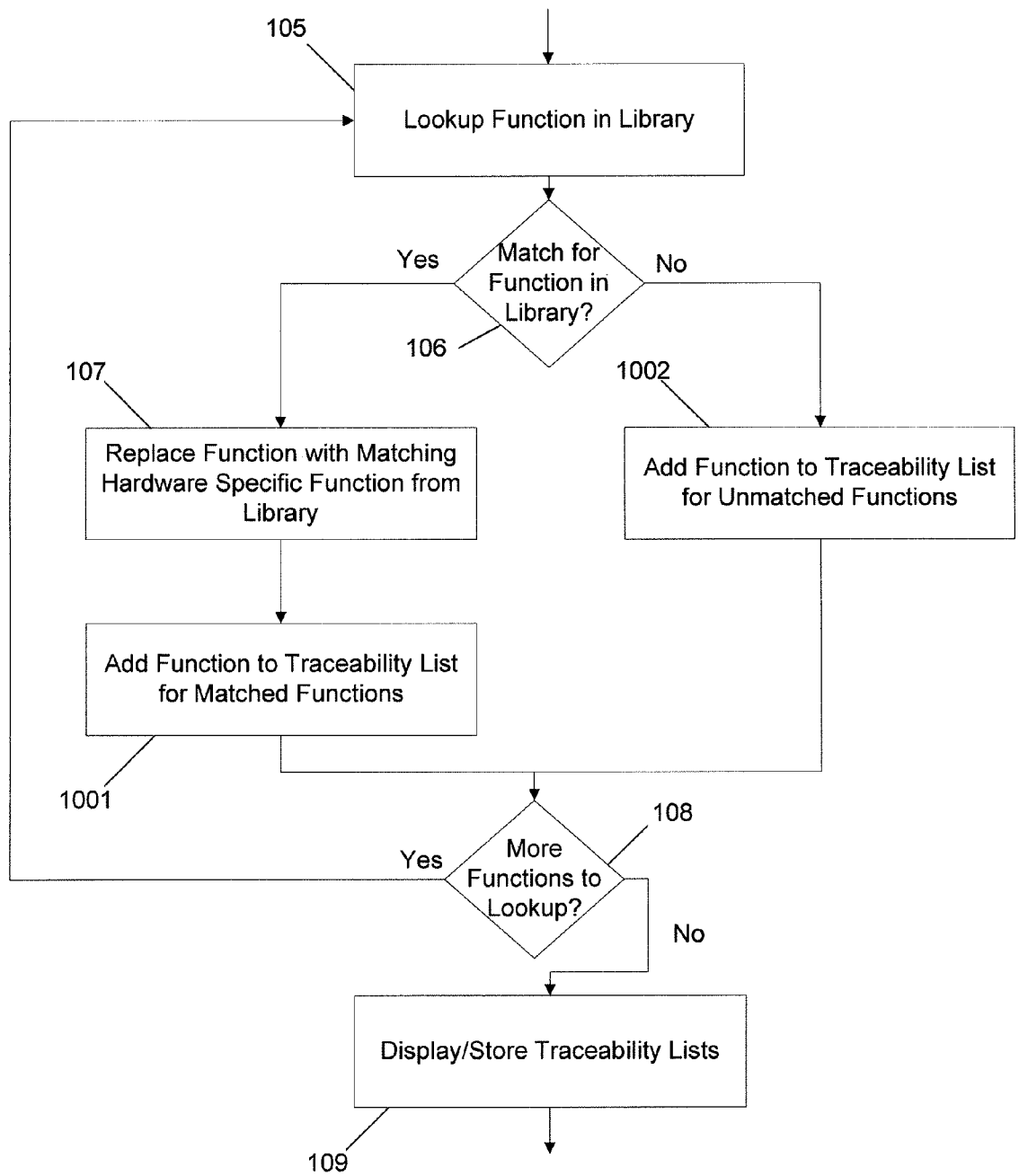
FIG. 10 depicts an exemplary processing for creating and displaying traceability lists.

FIG. 10 depicts an exemplary processing for creating and displaying traceability lists. Blocks 105, 106, 107, 108 and 109 are the same as those in FIG. 1.

In block 1001, the graphical model code function 209 that was replaced in block 107 may be added to the first traceability list 203. The first traceability list 203 may be a list containing all graphical model code functions 209 that were replaced by hardware specific functions 211 during the code generation process.

In block 1002, the graphical model code function 209 for which no match was found in the hardware specific library 204 may be added to the second traceability list 203. The second traceability list 203 may be a list containing all graphical model code functions 209 that were not replaced by hardware specific functions 211 during the code generations process.

Referring back to FIG. 2, a hardware specific library may be created from a documented application programming interface (API), allowing for extensibility and customization. FIGS. 12A-12C are a representative example of an API for creating a hardware specific library. Additionally, FIG. 13 contains a second API example for registering hardware specific libraries with the graphical model 203.

Referring back to FIG. 1, in block 110, another hardware specific library 205 may be selected. If another hardware specific library 205 is selected, flow proceeds back to block 103. Otherwise flow proceeds to block 111. Another hardware specific library 205 may be selected, for example, to allow for the graphical model code 208 to be to be run on multiple targets, for example different types of computer hardware. Selecting another hardware specific library 205 may result in the production of a second replacement graphical model code 240.

In block 111, flow ends. A replacement graphical model code 240, which may include hardware specific functions 211 that replaced graphical model code functions 209 and graphical model code functions 209 that were not replaced, may replace the graphical model code 208. In FIG. 2, the replacement graphical model code 240 is depicted outside the computer 201 and the modeling environment 202 for illustrative purposes. The replacement graphical model code may also be provided, for example, by a paper report, or by placing the replacement graphical model code on a computer different from the computer with the graphical modeling environment 202.

Figure 11:
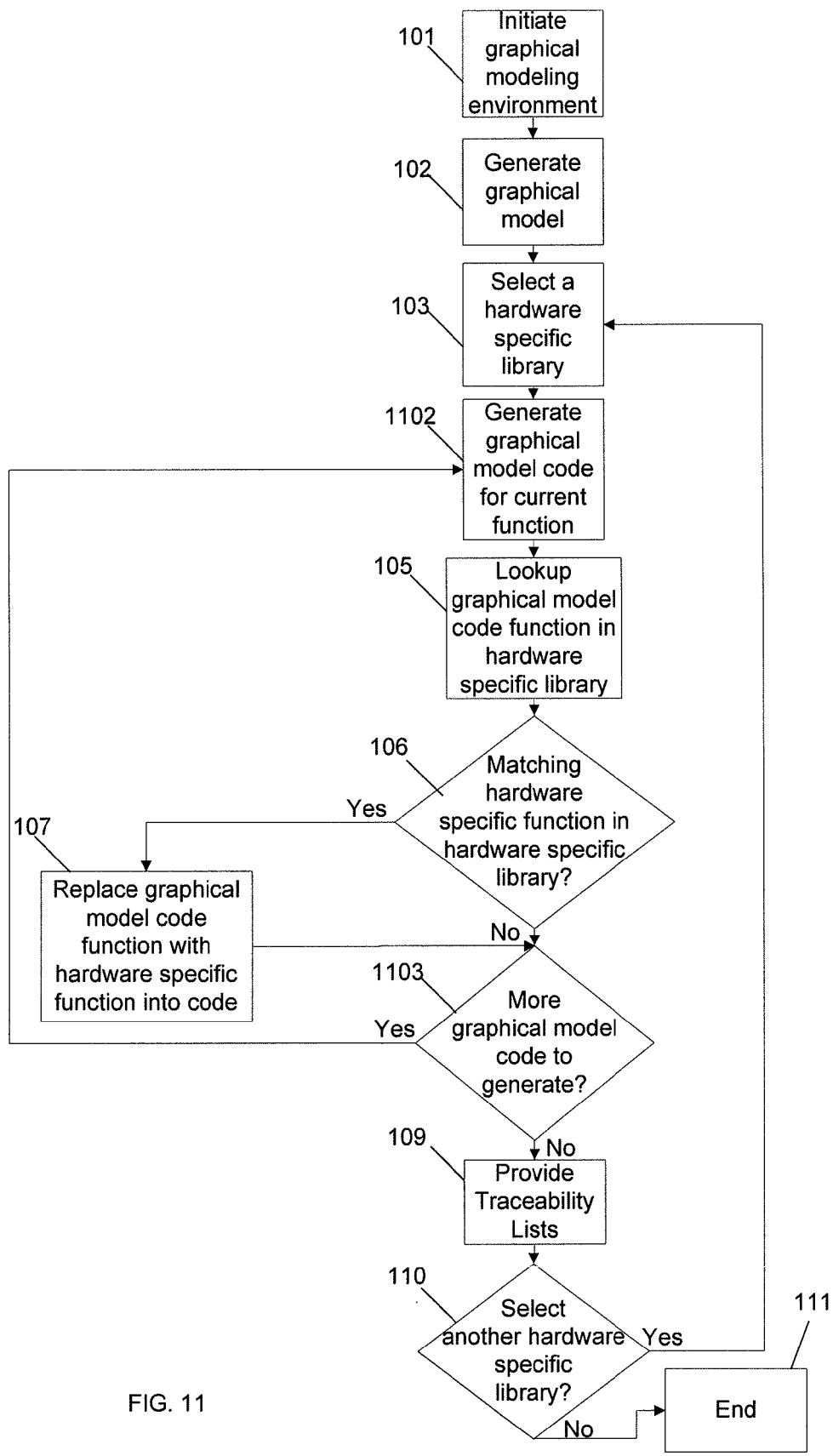
FIG. 11 depicts an exemplary processing for generating hardware specific code from a graphical model wherein the lookup process occurs during the graphical model translation process.

FIG. 11 depicts an exemplary embodiment of a method for generating hardware specific code from a graphical model wherein the lookup process occurs during the graphical model translation process. This method may be referred to as the code generation process. Blocks 101, 102, 103, 105, 106, 107, 109, 110, and 111 are the same as in FIG. 1.

In block 1102, the graphical modeling environment 202 may translate the graphical model 203 into the graphical model code 208. The graphical model code 208 may, be for example, C++ code. The graphical modeling environment 202 may translate a single graphical model code function 209 from the graphical model 203 based on the current location in the generation process. When block 1102 is reached from block 103, block 1102 may translate the first graphical model code function 209 from the graphical model 203. When block 1102 is reached from block 1103, block 1102 may translate subsequent graphical model code functions 209 from the graphical model 203.

In block 1103, if any of the graphical model 203 remains to be translated into graphical model code functions 209 which may then be looked up in the hardware specific library 204, flow proceeds back to block 105. Otherwise, flow proceeds to block 109.

Figure 14:
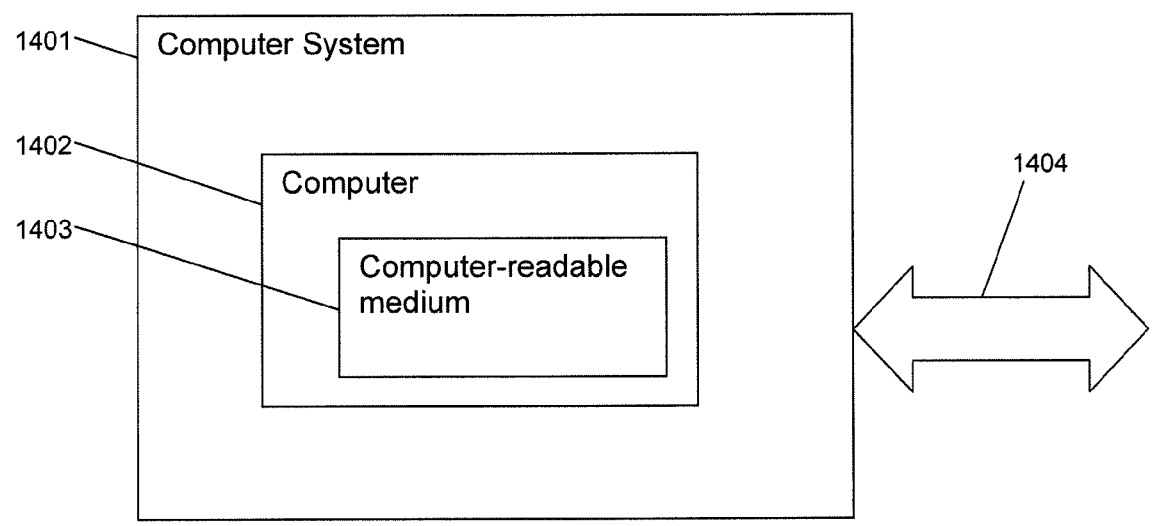
FIG. 14 depicts a computer system for use with the embodiments.

FIG. 14 depicts a computer system for use with the exemplary embodiments. The computer system 1401 may include a computer 1402 to support an implementation of the embodiments. The computer 1402 may include a computer-readable medium 1403 embodying software to support an implementation of the embodiments and/or software to operate the computer 1402 in accordance with the embodiments. As an option, the computer system 1401 may include a connection to a network 1404. With this option, the computer 1402 may be able to send and receive information (e.g., software, data, documents) from other computer systems via the network 1404.

Exemplary embodiments may be embodied in many different ways as a software component. For example, it may be a stand-alone software package, or it may be a software package incorporated as a "tool" in a larger software product, such as, for example, a mathematical analysis product or a statistical analysis product. It may be downloadable from a network, for example, a website, as a stand-alone product or as an add-in package for installation in an existing software application. It may also be available as a client-server software application, or as a web-enabled software application.

Figure 15:
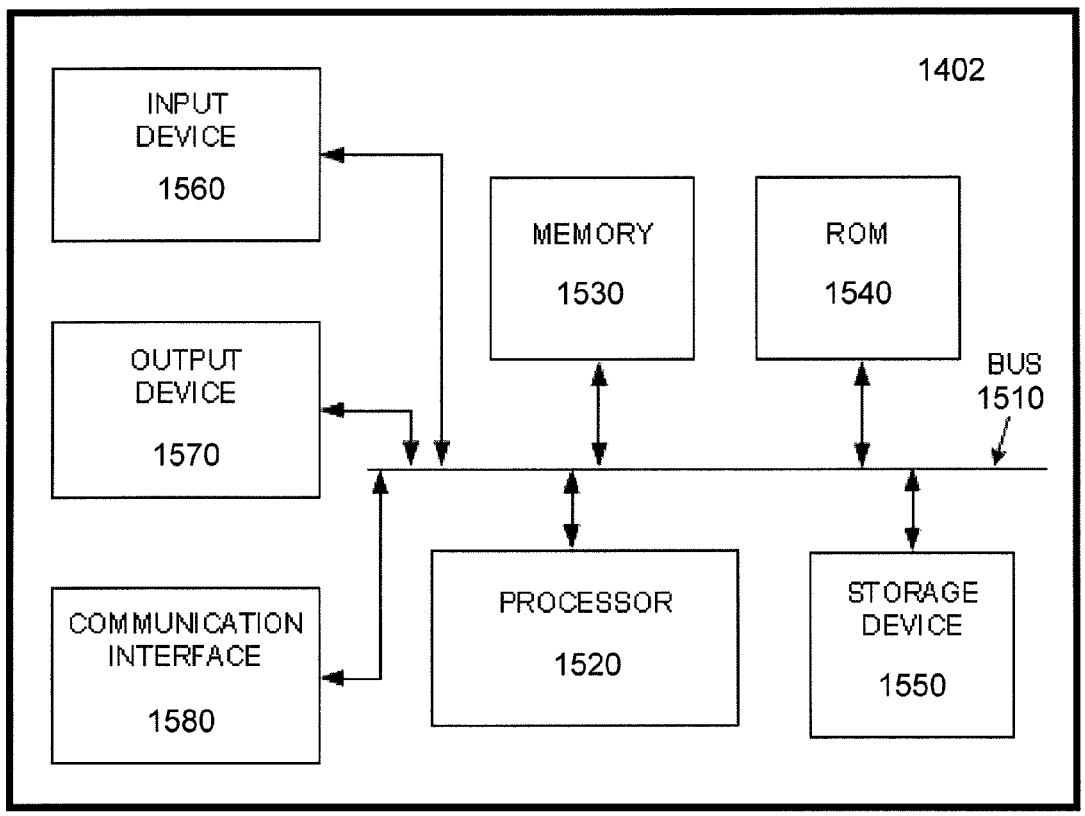
FIG. 15 depicts an exemplary computer architecture for a computer system for use with embodiments of the present invention.

FIG. 15 illustrates an exemplary architecture for implementing computer 1502 of FIG. 14. As illustrated in FIG. 14, computer 1402 may include a bus 1510, a processor 1520, a memory 1530, a read only memory (ROM) 1540, a storage device 1550, an input device 1560, an output device 1570, and a communication interface 1580.

Bus 1510 may include one or more interconnects that permit communication among the components of computer 1402. Processor 1520 may include any type of processor, microprocessor, or processing logic that may interpret and execute instructions (e.g., a field programmable gate array (FPGA)). Processor 1520 may include a single device (e.g., a single core) and/or a group of devices (e.g., multi-core). Memory 1530 may include a random access memory (RAM) or another type of dynamic storage device that may store information and instructions for execution by processor 1520. Memory 1530 may also be used to store temporary variables or other intermediate information during execution of instructions by processor 1520.

ROM 1540 may include a ROM device and/or another type of static storage device that may store static information and instructions for processor 1520. Storage device 1550 may include a magnetic disk and/or optical disk and its corresponding drive for storing information and/or instructions. Storage device 1550 may include a single storage device or multiple storage devices, such as multiple storage devices operating in parallel. Moreover, storage device 1550 may reside locally on computer 1402 and/or may be remote with respect to a server and connected thereto via network and/or another type of connection, such as a dedicated link or channel.

Input device 1560 may include any mechanism or combination of mechanisms that permit an operator to input information to computer 1402, such as a keyboard, a mouse, a touch sensitive display device, a motion based device, a camera, such as a webcam, a thumb wheel or jog dial, a touchpad, a joystick, a microphone, a pen-based pointing device, and/or a biometric input device, such as a voice recognition device and/or a finger print scanning device. Output device 1570 may include any mechanism or combination of mechanisms that outputs information to the operator, including a display, a printer, a speaker, etc.

Communication interface 1580 may include any transceiver-like mechanism that enables computer 1402 to communicate with other devices and/or systems, such as client, license manager, vendor, etc. For example, communication interface 1580 may include one or more interfaces, such as a first interface coupled to network and/or a second interface coupled to license manager. Alternatively, communication interface 1580 may include other mechanisms (e.g., a wireless interface) for communicating via a network, such as a wireless network. In one implementation, communication interface 1580 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computer 1402 may perform certain functions in response to processor 1520 executing software instructions contained in a computer-readable medium, such as memory 1530. A computer-readable medium may be defined as one or more memory devices and/or carrier waves. In alternative embodiments, hardwired circuitry may be used in place of or in combination with software instructions to implement features consistent with principles of the invention. Thus, implementations consistent with principles of the invention are not limited to any specific combination of hardware circuitry and software.

Exemplary implementations may allow for the generation of hardware specific code from a model, such as a graphical model. Hardware specific code generated using exemplary embodiments may efficiently use logic features associated with a piece of target hardware onto which the hardware specific code is used.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 1, 6, 7, 10 and 11, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 2-4, 8-9, and 14-15 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, wetware, or any combination of hardware, software, and wetware.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. One or more non-transitory computer-readable media holding executable instructions that when executed on a processing device replaces functions in model code, the media holding one or more instructions for:
    identifying a pattern in model code, where:
        the model code is associated with a graphical model having executable semantics,
        the pattern is associated with a function in the model code, and
        the function performs operations when the model code is executed;
    selecting, for the identified pattern, a hardware specific function that performs an operation equivalent to an operation performed by the function in the model code;
    replacing the function in the model code with the selected hardware specific function, wherein conceptual arguments of the selected hardware specific function match argument properties of the function, and wherein argument properties of the selected hardware specific function do not exactly match function properties of the function; and
    storing the model code.

2. The media of claim 1, further holding one or more instructions for:
    generating executable code from the graphical model, where the generated code includes code for the selected hardware specific function.

3. The media of claim 1, wherein identifying a pattern in the model code further comprises identifying two or more patterns in the model code.

4. The media of claim 1, wherein the hardware specific function is executable in a target environment.

5. The media of claim 1, wherein the pattern is identified in an intermediate representation of the model code.

6. The media of claim 1, wherein the function is a matrix function.

7. The media of claim 1, wherein selecting the hardware specific function is based on the argument properties or data type of the function in the model code.

8. One or more non-transitory computer-readable media holding executable instructions that when executed on a processing device replaces operators in model code, the media holding one or more instructions for:
identifying a pattern in model code, where:
the model code is associated with a graphical model having executable semantics,
the pattern is associated with an operator in the model code, and
the operator performs operations when the model code is executed;
selecting, for the identified pattern, a hardware specific function that performs an operation equivalent to a respective operation performed by the operator in the model code;
replacing the operator in the model code with the selected hardware specific function, wherein conceptual arguments of the selected hardware specific function match argument properties of the operator, and wherein argument properties of the selected hardware specific function do not exactly match function properties of the operator; and
storing the model code.

9. The media of claim 8, further holding one or more instructions for:
generating executable code from the graphical model, where the generated code includes code for the selected hardware specific operator.

10. The media of claim 8, wherein identifying a pattern in the model code further comprises identifying two or more patterns in the model code.

11. The media of claim 8, wherein the hardware specific function is executable in a target environment.

12. The media of claim 8, wherein the pattern is identified in an intermediate representation of the model code.

13. The media of claim 8, wherein operation is a matrix operation.

14. The media of claim 8, wherein selecting the hardware specific function is based on the argument properties or data type of the operator in the model code.

15. One or more non-transitory computer-readable media holding executable instructions that when executed on a processing device replaces functions and operators in model code, the media holding one or more instructions for:
identifying a pattern in model code, where:
the model code is associated with a graphical model having executable semantics,
the pattern is associated with a function or an operator in the model code, and
the function or the operator performs operations when the model code is executed;
selecting a hardware specific function that performs an operation equivalent to a respective operation performed by the identified pattern;
replacing the identified pattern with the selected hardware specific function;
receiving a selection of a first hardware specific library from a plurality of hardware specific libraries,
the hardware specific libraries corresponding to one of a first target environment and a second target environment,
the first hardware specific library corresponding to the first target environment,
the hardware specific libraries comprising a plurality of relationships between the model code and hardware specific functions, and
the hardware specific functions being executable in the first target environment;
performing a lookup of the identified pattern in the first hardware specific library, wherein selecting the hardware specific function is based on the lookup; and
storing the model code.

16. A computer-implemented method for generating code based on a graphical model, the method comprising:
identifying, using a processor, a pattern in model code, where:
the model code is associated with a graphical model having executable semantics,
the pattern is associated with a function or an operator in the model code, and
the function or the operator performs operations when the model code is executed;
selecting a hardware specific function that performs an operation equivalent to a respective operation performed by the identified pattern;
replacing the identified pattern with the hardware specific function selected by the lookup;
receiving a selection of a first hardware specific library from a plurality of hardware specific libraries,
the hardware specific libraries corresponding to one of a first target environment and a second target environment,
the first hardware specific library corresponding to the first target environment;
the hardware specific libraries comprising a plurality of relationships between the model code and hardware specific functions, and
the hardware specific functions being executable in the first target environment; and
performing a lookup of the identified pattern in the first hardware specific library, wherein selecting the hardware specific function is based on the lookup.

17. The method of claim 16, further comprising:
generating executable code from the graphical model, where the generated code includes code for the selected hardware specific function.

18. The method of claim 16, wherein identifying a pattern in the model code further comprises identifying two or more patterns in the model code.

19. The method of claim 16, wherein the hardware specific function is executable in a target environment.

20. The method of claim 16, wherein the pattern is identified in an intermediate representation of the model code.

21. The method of claim 16, wherein the function is a matrix function or the operation is a matrix operation.

22. The method of claim 16, wherein selecting the hardware specific function is based on argument properties or data type of the function or the operator in the model code.

23. The method of claim 16, wherein conceptual arguments of the selected hardware specific function match argument properties of the function or the operator, and wherein argument properties of the selected hardware specific function do not exactly match the function properties of the function or the operator.

24. A computer-implemented method for generating code based on a graphical model, the method comprising:
  downloading software or providing downloadable software to a computer system, which when executed by the computer system causes the computer system to perform operations comprising the method of claim 16.

25. A system for generating code based on a graphical model comprising:
  one or more processors;
  a memory coupled to the one or more processors, the memory storing instructions executed by the one or more processors, the memory including:
    instructions for identifying a pattern in model code, where:
      the model code is associated with a graphical model having executable semantics,
      the pattern is associated with a function or an operator in the model code, and
      the function or the operator performs operations when the model code is executed;
    instructions for selecting, a hardware specific function for the function or the operator in the identified pattern, the hardware specific function performs an operation equivalent to a respective operation performed by the function or operator in the model code, wherein conceptual arguments of the selected hardware specific function match argument properties of the function or the operator, and wherein argument properties of the selected hardware specific function do not exactly match function properties of the function or the operator;
    instructions for replacing, for the function or the operator in the identified pattern:
      the function in the model code with the selected hardware specific function, or
      the operator in the model code with the selected hardware specific function; and
    instructions for storing the model code.

* * * * *